(12) United States Patent
Cardona et al.

(10) Patent No.: US 7,715,321 B2
(45) Date of Patent: May 11, 2010

(54) NETWORK INTERFACE CARD TRANSMISSION CONTROL PROTOCOL ACCELERATION OFFLOAD FAILURE DETECTION AND RECOVERY MECHANISM

(75) Inventors: Omar Cardona, Austin, TX (US); James Brian Cunningham, Austin, TX (US); Baltazar De Leon, III, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 11/668,901

(22) Filed: Jan. 30, 2007

(65) Prior Publication Data

US 2008/0183901 A1 Jul. 31, 2008

(51) Int. Cl.
*H04J 1/16* (2006.01)
(52) U.S. Cl. ...................................... 370/242
(58) Field of Classification Search ......... 370/241–253, 370/229, 235, 236; 712/34, 35
See application file for complete search history.

(56) References Cited

U.S. PATENT DOCUMENTS

| 5,898,713 | A | 4/1999 | Melzer et al. |
| 6,208,616 | B1* | 3/2001 | Mahalingam et al. ....... 370/216 |
| 2004/0199808 | A1* | 10/2004 | Freimuth et al. ............... 714/4 |
| 2005/0147126 | A1 | 7/2005 | Qiu et al. |
| 2006/0133419 | A1 | 6/2006 | Ronciak et al. |
| 2006/0221827 | A1 | 10/2006 | Makhervaks et al. |
| 2007/0220514 | A1* | 9/2007 | Sugimoto et al. ........... 718/100 |
| 2008/0025226 | A1* | 1/2008 | Mogul et al. ............... 370/242 |

FOREIGN PATENT DOCUMENTS

EP 1396977 A2 10/2004

* cited by examiner

*Primary Examiner*—Kwang B Yao
*Assistant Examiner*—Obaidul Huq
(74) *Attorney, Agent, or Firm*—Yee & Associates, P.C.; Matthew W. Baca

(57) ABSTRACT

A computer implemented method and data processing system for the detection and recovery of a network interface card TCP acceleration offload failure. Responsive to a failure to receive an acknowledgement of a transmission control protocol segment containing a request for a transmission control protocol offload function in a network interface card, the transmission control protocol segment is retransmitted without the request for a transmission control protocol offload function. When an acknowledgement of the retransmitted transmission control protocol segment without the request for a transmission control protocol offload function is received, a counter is incremented which indicates a failure of the transmission control protocol offload function. Responsive to the counter exceeding a predefined number of allowed failures, all requests to the transmission control protocol offload function for the network interface card are stopped.

20 Claims, 4 Drawing Sheets

NETWORK INTERFACE CARD TRANSMISSION CONTROL PROTOCOL ACCELERATION OFFLOAD FAILURE DETECTION AND RECOVERY MECHANISM

BACKGROUND OF THE INVENTION

1. Field of the Invention

The present invention relates generally to an improved data processing system, and in particular to a computer implemented method and data processing system for the detection and recovery of a network interface card (NIC) transmission control protocol (TCP) acceleration offload failure.

2. Description of the Related Art

Data communications have grown exponentially in recent years because of enhanced communications standards and network availability. Transmission control protocol (TCP) is a standard that ensures that packets of data are delivered and received in the same order they were sent and Internet Protocol (IP) is used in conjunction with TCP to designate how information travels between systems across the Internet. Most computers have a network interface card that uses the TCP/IP protocols to send and receive information through a network.

In a traditional network interface card, the TCP stack uses the system processor to break a TCP segment down into Ethernet frames before passing the data to the network interface card. This requires a large amount of processing time, especially in a Gigabit network where a network interface card can generate tens of thousands of interrupts per second. These interrupts utilize even more processor cycles.

While local area network (LAN) technology, Ethernet in particular, has improved the media speed tenfold every 3 to 4 years, the central processing unit (CPU) speed doubles every other year. Consequently, the CPUs are becoming the bottleneck at a rapid rate in high input/output (I/O) performance systems. To alleviate this lag in processor performance, an increasing number of native host functions can be offloaded to I/O adapters to accelerate data throughput. Throughput is a measure of the amount of data transferred in a specific amount of time. Offloading functions reduces the host CPU workload and has the added benefit of improving the I/O adapter throughput.

One TCP acceleration offload function is TCP segmentation offload (TSO). In TCP segmentation offload, also known as "large send offload" (LSO), the host TCP protocol stack creates a large TCP segment, up to 64 KB in size. This large segment is then passed to the IP Protocol stack, where the segment is encapsulated in a single IP packet. The encapsulated segment is then passed to the network interface card device driver and finally to the network interface card for transmission. The network interface card which implements TCP segmentation offload then resegments this single large TCP segment into multiple smaller TCP segments which are typically 1460 bytes for a standard Ethernet connection and inserts the necessary Ethernet/IP/TCP header information for each segment. The performance benefit of using segmentation offloading is gained by the fact that larger packets can be built by the host TCP stack, which typically translates into reduced host processor utilization. An additional performance benefit is gained by virtue of the fact that, in general, larger PCI data transactions translate into higher PCI bus throughput. Since the work of segmenting the buffer into Ethernet frames is done by the network interface card, the processor is available to perform other tasks.

Another TCP acceleration offload function is TCP checksum offload (TCO). In TCP checksum offload, the network interface card which implements TCP checksum offload performs the calculation of the TCP checksum instead of the host CPU. TCP checksum offload can significantly reduce host CPU workload because the task of performing a checksum of the TCP payload, TCP header, and IP header is offloaded to the network interface card. The host protocol layer may optionally calculate a TCP pseudo header checksum (depending on the specific requirements of the network interface card) and places the value in the checksum field. The network interface card may then calculate the correct TCP checksum without having to reference the IP header.

When the TCP acceleration offload functions operate as intended, network and system performance may be significantly enhanced. Thus, many operation systems take advantage of these acceleration features, including AIX® (Advanced Interactive eXecutive), a product of IBM® Corporation.

However, a significant limitation of current TCP acceleration offload functions is that severe problems can result when these acceleration offload functions fail to operate correctly. For example, the TCP checksum generator logic in a network interface card may transition to a "bad" state due to a failure in the card's hardware state machine or microcode which implements this logic. In this situation, every TCP checksum offload packet sent by the adapter would have an invalid TCP checksum, which would result in these packets being discarded by the destination host. Thus, when acceleration offload functions fail to operate as intended, severe network degradation can occur, often to the point where the network appears to be practically unusable.

SUMMARY OF THE INVENTION

The illustrative embodiments provide a computer implemented method and data processing system for the detection and recovery of a network interface card TCP acceleration offload failure. Responsive to a failure to receive an acknowledgement of a transmission control protocol segment containing a request for a transmission control protocol offload function in a network interface card, the transmission control protocol segment is retransmitted without the request for a transmission control protocol offload function. When an acknowledgement of the retransmitted transmission control protocol segment without the request for a transmission control protocol offload function is received, a counter is incremented which indicates a failure of the transmission control protocol offload function. Responsive to the counter exceeding a predefined number of allowed failures, all requests to the transmission control protocol offload function for the network interface card are stopped.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
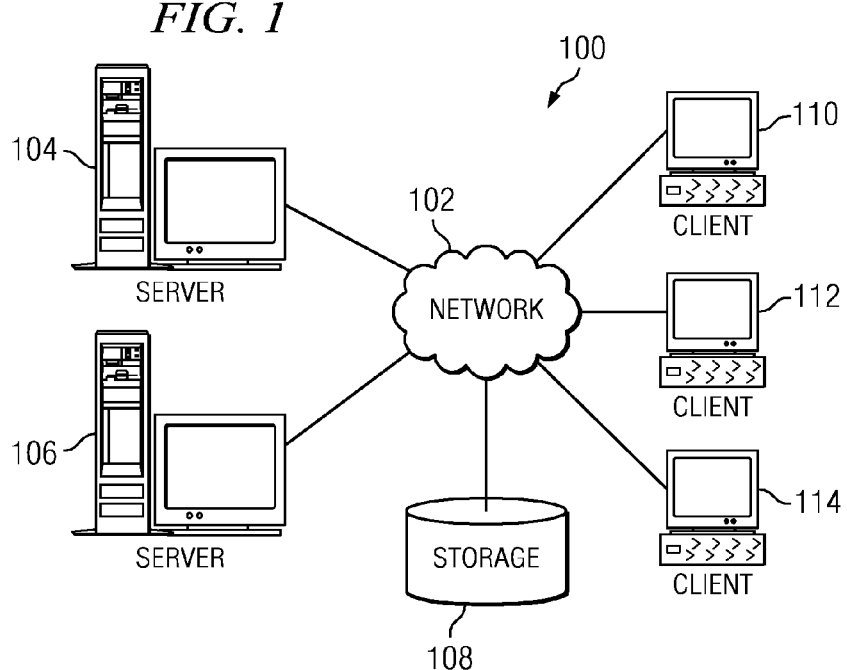
FIG. 1 is a pictorial representation of a network of data processing systems in which the illustrative embodiments may be implemented.
Figure 2:
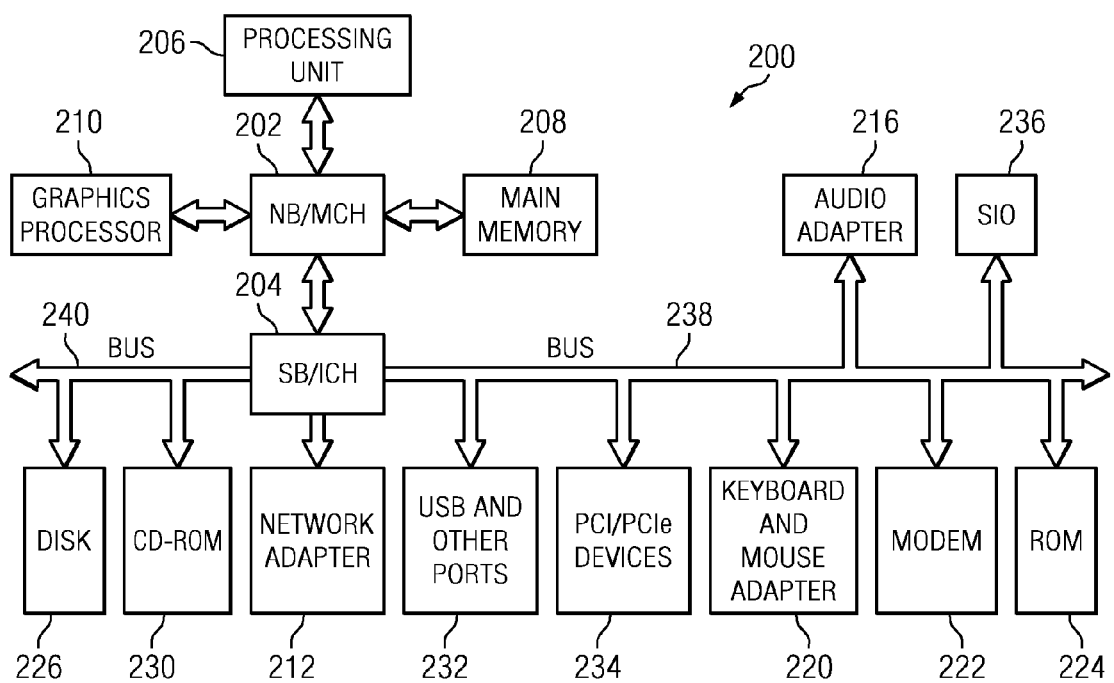
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method and data processing system for the detection and recovery of a network interface card (NIC) transmission control protocol (TCP) acceleration offload failure. In particular, the illustrative embodiments leverage the existing retransmission protocol within TCP in order to enable the TCP stack of the operating system to detect and recover from a chronic network interface card TCP acceleration offload failure. The existing retransmission protocol of TCP includes the ability to retransmit data segments that are not acknowledged by the receiving device. For instance, TCP may make use of a retransmission timer which causes TCP to resend a data segment multiple times until receipt of the data segment is acknowledges by the receiving device, or when TCP determines that a maximum number of retransmissions to the receiving device has been exceeded. In addition, the illustrative embodiments also use the existing ability of operating system TCP stacks which support network interface card TCP acceleration offload functions, such as TCP checksum offload or TCP segmentation offload, to explicitly request the offload service for each individual data segment built by TCP. Thus, these TCP stacks have the ability to choose not to request a TCP acceleration offload function, even if the underlying network interface card supports the offload function.

Using the current abilities of TCP listed above, the illustrative embodiments provide a mechanism in which an operating system's TCP stack may detect transmission failures that are specifically caused by network interface card TCP acceleration offload failures (as opposed to other network issues or failures). The mechanism also allows the TCP stack to cease using the network interface card TCP acceleration offload functions for the failing network interface card, thus facilitating recovery from the failure without requiring user intervention.

Figure 6:
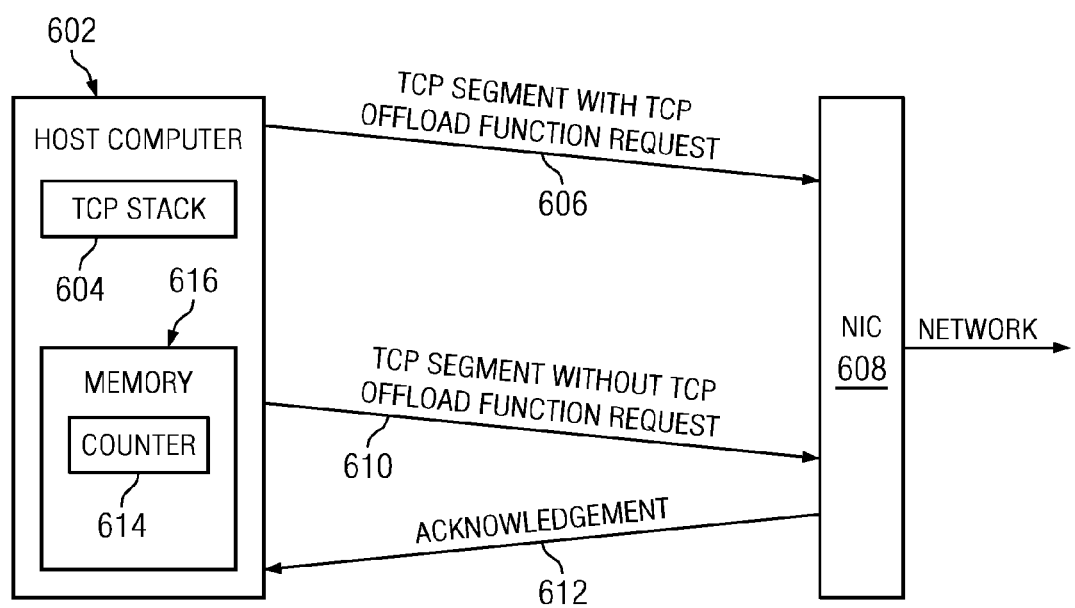
FIG. 6 is a diagram of an interaction between the host computer and the network interface card illustrating a failure of the transmission control protocol offload function in accordance with the illustrative embodiments.

As further shown in FIG. 6, the mechanism in the illustrative embodiments may be implemented when an operating system TCP stack 604 in host computer 602 creates a TCP segment 606 which requests a network interface card 608 to perform TCP checksum offload or TCP segmentation offload for the segment. If the operating system TCP stack does not receive an acknowledgement for the segment in a predefined time interval, the operating system TCP stack retransmits the segment. To detect and recover from of a network interface card TCP acceleration offload failure, when the operating system TCP stack still does not receive an acknowledgement after a predefined number of retransmission attempts and TCP checksum offload or TCP segmentation offload was previously requested for the segment, the operating system TCP stack retransmits the segment without the TCP checksum offload or TCP segmentation offload requested 610. If the operating system TCP stack then receives an acknowledgement for the segment 612, the operating system TCP stack increments a private counter 614 in host memory 616 which indicates the number of times the operating system TCP stack suspects a condition where the network interface card's TCP acceleration offload function is failing. If the private counter reaches a predefined number of "allowed" failures, the operating system TCP stack ceases to request any TCP acceleration offload functions from that network interface card, for any existing or new TCP connections, and also for a predefined period of time (minutes, hours, days, or until the system is rebooted).

Figure 3:
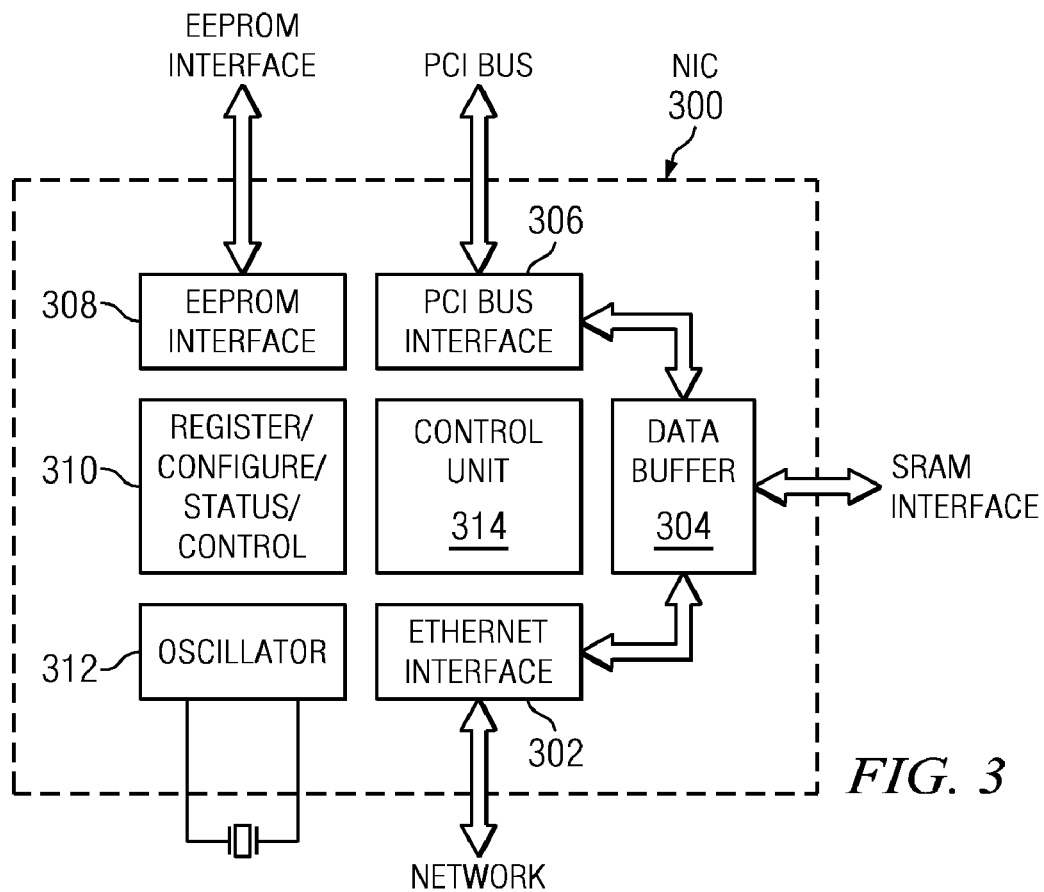
FIG. 3 is a block diagram of a network interface card in accordance with the illustrative embodiments.

Turning now to FIG. 3, a diagram of a network interface card is depicted in accordance with the illustrative embodiments. Network interface card 300 may be implemented as network adapter 212 in FIG. 2. As shown, network interface card 300 includes Ethernet interface 302, data buffer 304, and PCI bus interface 306. These three components provide a path between the network and the bus of the data processing system. Ethernet interface 302 provides an interface to the network connected to the data processing system. PCI bus interface 306 provides an interface to a bus. Data buffer 304 is used to store data being transmitted and received through network interface card 300. This data buffer also includes a connection to a SRAM interface to provide for additional storage.

Network interface card 300 also includes electrically erasable programmable read-only memory (EEPROM) interface 308, register/configure/status/control unit 310, oscillator 312, and control unit 314. EEPROM interface 308 provides an interface to an EEPROM chip, which may contain instructions and other configuration information for network interface card 300. Different parameters and setting may be stored on an EEPROM chip through EEPROM interface 308.

Register/configure/status/control unit 310 provides a place to store information used to configure and run processes on network interface card 300. For example, a timer value for a timer may be stored within these registers. Additionally, status information for different processes also may be stored within this unit. Oscillator 312 provides a clock signal for executing processes on network interface card 300.

Control unit 314 controls the different processes and functions performed by network interface card 300. Control unit 314 may take various forms. For example, control unit 314 may be a processor or an application-specific integrated chip (ASIC). In these examples, the processes of the present invention used to manage flow control of data are executed by control unit 314. If implemented as a processor, the instructions for these processes may be stored in a chip accessed through EEPROM interface 308.

Data is received in receive operations through Ethernet interface 302. This data is stored in data buffer 304 for transfer onto the data processing system across PCI bus interface 306. For example, the data may be transferred onto a bus using a PCI local bus or via ICH 210 in FIG. 2.

Figure 4:
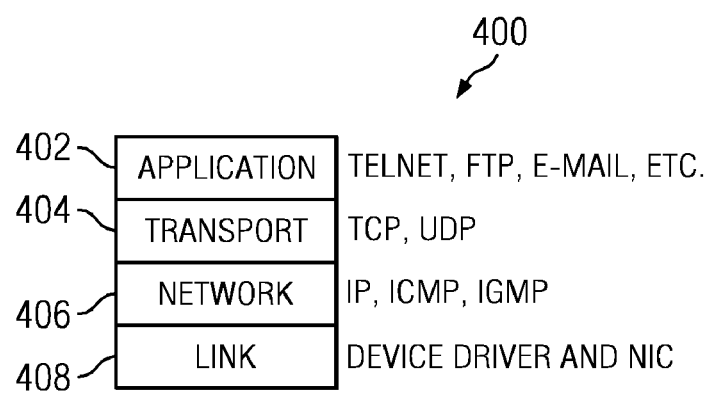
FIG. 4 is a diagram of a transmission control protocol/Internet protocol (TCP/IP) and similar protocols in accordance with the illustrative embodiments.

FIG. 4 is a diagram of a transmission control protocol/Internet protocol (TCP/IP) and similar protocols and is depicted in accordance with a illustrative embodiment of the present invention. TCP/IP and similar protocols are utilized by communications architecture 400. In this example, communications architecture 400 is a 4-layer system. This architecture includes application layer 402, transport layer 404, network layer 406, and link layer 408. Each layer is responsible for handling various communications tasks. Link layer 408 also is referred to as the data-link layer or the network interface layer and normally includes the device driver in the operating system and the corresponding network interface card in the computer. This layer handles all the hardware details of physically interfacing with the network media being used, such as optical cables or Ethernet cables.

Network layer 406 also is referred to as the internet layer and handles the movement of packets of data around the network. For example, network layer 406 handles the routing of various packets of data that are transferred over the network. Network layer 406 in the TCP/IP suite is comprised of several protocols, including Internet Protocol (IP), Internet control message protocol (ICMP), and Internet group management protocol (IGMP).

Next, transport layer 404 provides an interface between network layer 406 and application layer 402 that facilitates the transfer of data between two host computers. The detection and recovery method described in the illustrative embodiments may be implemented using various transfer protocols. Transport layer 404 is concerned with things such as, for example, dividing the data passed to it from the application into appropriately sized chunks for the network layer below, acknowledging received packets, and setting timeouts to make certain the other end acknowledges packets that are sent. In the TCP/IP protocol suite, two distinctly different transport protocols are present: TCP and user datagram protocol (UDP). TCP provides reliability services to ensure that data is properly transmitted between two hosts, including dropout detection and retransmission services.

TCP segmentation and TCP checksum are used as an exemplary implementation of embodiments of the present invention and in no way limits segmentation offload and checksum offload to the TCP suite of protocols. In other embodiments, segmentation offloading and checksum offloading may be used with any transport protocol, for example, user datagram protocol and other versions of TCP protocol.

Conversely, user datagram protocol provides a much simpler service to the application layer by merely sending packets of data called datagrams from one host to the other, without providing any mechanism for guaranteeing that the data is properly transferred. When using UDP, the application layer must perform the reliability functionality.

Application layer 402 handles the details of the particular application. Many common TCP/IP applications are present for almost every implementation, including a Telnet for remote login; a file transfer protocol (FTP); a simple mail transfer protocol (SMTP) for electronic mail; and a simple network management protocol (SNMP).

Figure 5:
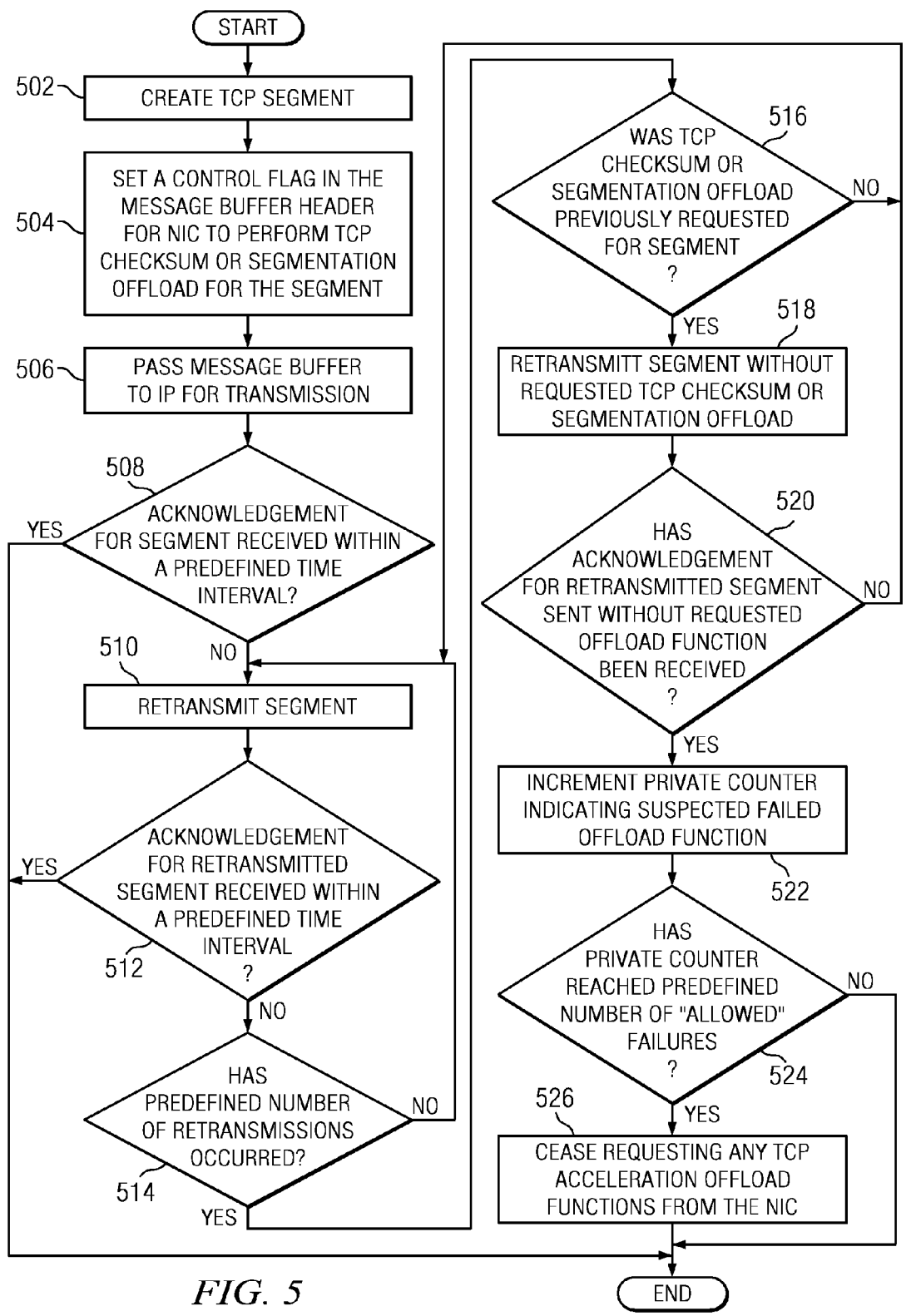
FIG. 5 is a flowchart illustrating the detection and recovery of a network interface card TCP acceleration offload failure in accordance with the illustrative embodiments.

FIG. 5 is a flowchart illustrating the process of detection and recovery of a network interface card TCP acceleration offload failure in accordance with the illustrative embodiments. TCP is a protocol often used for data transfer and for that reason provides an illustrative example of an implementation of one illustrative embodiment in an exemplary protocol. A TCP stack is implemented in the operating system of a device and is executed by the processor. The TCP stack sends and receives information from the network interface card driver to ensure successful segmentation. Instructions for the TCP stack and corresponding operating system may be stored, loaded, and executed in a data processing system, such as stored within disk 226 or main memory 208 in data processing system 200, and executed by processing unit 206 or network adapter 212 shown in FIG. 2.

The process begins when the operating system TCP stack creates a TCP segment (step 502). The operating system TCP stack sets a control flag or flags in the message buffer header to indicate to the network interface card to perform TCP checksum offload or TCP segmentation offload for this segment (step 504). The operating system TCP stack also maintains a table within the TCP stack's per-session internal control block in host memory. This table contains an entry for each transmitted segment that was associated with a TCP offload request. Within step 504, the operating system TCP stack creates these entries and places them into this table for each transmitted segment associated with a TCP offload request. The operating system TCP stack then passes the message buffer to IP for transmission (step 506).

The operating system TCP stack determines if an acknowledgement for that segment has been received in a predefined time interval (step 508). If an acknowledgement has been received ("yes" output of step 508), the process terminates thereafter. If an acknowledgement has not been received ("no" output of step 508), the operating system TCP stack retransmits the segment (step 510). Each time a retransmission is performed, a retransmit backoff algorithm may cause the predefined time interval to increase.

It should be noted that the steps prior to this point describe the TCP protocol as it currently functions. The following steps describe TCP functions which enable the detection and recovery of network interface card TCP acceleration offload failure in the illustrative embodiments.

The operating system TCP stack then determines if an acknowledgement for the retransmitted segment has been received in the predefined time interval (step 512). If an acknowledgement has been received ("yes" output of step 512), the process terminates thereafter. If an acknowledgement has not been received ("no" output of step 512), the operating system TCP stack determines if a predefined number of retransmission attempts has occurred (step 514). In other words, the operating system TCP stack determines if the number of retransmissions is equal to the predefined value. The operating system TCP stack maintains a retransmit counter for each active TCP session in order to implement the retransmit capability of the TCP protocol. When the operating system TCP stack performs a packet retransmission for a given session, it also increments the retransmit counter for that session. The retransmit counter may be stored by the operating system TCP stack in a per-session internal control block in host memory.

If the predefined number of retransmission attempts has not been met ("no" output of step 514), the process loops back to step 510. If the predefined number of retransmission attempts has been met ("yes" output of step 514), the operating system TCP stack determines whether a TCP checksum offload or TCP segmentation offload was previously requested for the segment (step 516). This determination may be made by accessing the table maintained in step 504 to determine if this segment was sent with a TCP acceleration offload request, such as TCP checksum offload or TCP segmentation offload.

If no TCP checksum or segmentation offload was previously requested for the segment ("no" output of step 516), the TCP retransmit algorithm returns to step 510 and continues to function as currently implemented (i.e., in a manner consistent with current TCP stack implementations in the industry).

If a TCP checksum or segmentation offload was previously requested for the segment ("yes" output of step 516), the operating system TCP stack retransmits the segment with no TCP checksum offload or TCP segmentation offload requested (step 518).

The operating system TCP stack then determines if an acknowledgement for the retransmitted segment without the requested offload function has been received (step 520). If an acknowledgement of the retransmitted segment is received ("yes" output of step 520), the operating system TCP stack increments a private counter which indicates the number of times the operating system TCP stack suspects a condition where the network interface card's TCP acceleration offload function is failing (step 522). The private counter may be contained within the per-session internal control block which is maintained by the host TCP stack, and stored in host memory. If no acknowledgement of the retransmitted segment is received ("no" output of step 520), the operating system TCP stack may assume that the transmission failure is not due to a network interface card TCP acceleration offload failure, thus the private counter is not incremented and the process returns to step 510 to function as currently implemented (i.e., the host TCP stack continues to perform the TCP retransmit algorithm as currently defined by the industry).

Turning back to step 522, the operating system TCP stack determines whether the private counter has reached a predefined number of "allowed" failures (e.g., four failures) (step 524). If a predefined number of "allowed" failures has not been reached ("no" output of step 524), the process terminates thereafter. If a predefined number of "allowed" failures has been reached ("yes" output of step 524), the operating system TCP stack stops requesting any TCP acceleration offload functions from that network interface card (step 526). The operating system TCP stack may stop requesting any offload functions from the network interface card for any existing or new TCP connections, as well as for a predefined period of time (e.g., minutes, hours, days, until the system is rebooted, etc.) The number of "allowed" failures may likewise be bounded by a predefined time period if desired. For example, the operating system TCP stack may allow no more than four failures within a 60-minute time interval.

It should be noted that the illustrative embodiments protect against a "false positive" condition where the operating system TCP stack may mistakenly conclude that a network interface card TCP acceleration offload function is failing because a successful transmission happens to coincide with disablement of network interface card TCP stack acceleration offload functions. By using a private counter and a predefined number of "allowed" failures, the likelihood of disabling a perfectly functioning network interface card is greatly reduced.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for the detection and recovery of a network interface card transmission control protocol acceleration offload failure, the method comprising:
   responsive to a failure of a host computer to receive an acknowledgement of a transmission control protocol segment comprising a request for a transmission control protocol offload function from a network interface card, retransmitting, by the host computer, the transmission control protocol segment to the network interface card, wherein the retransmitted transmission control protocol segment does not comprise the request for the transmission control protocol offload function;
   receiving an acknowledgement of the retransmitted transmission control protocol segment by the host computer, wherein receipt of the acknowledgement of the retransmitted transmission control protocol segment indicates the transmission control protocol offload function has failed;
   responsive to receiving the acknowledgement of the retransmitted transmission control protocol segment, incrementing, by the host computer, a counter to indicate a failure of the transmission control protocol offload function; and
   responsive to determining that the counter has exceeded a predefined number of allowed transmission control protocol offload function failures, stopping all transmission control protocol offload function requests to the network interface card for any existing or new transmission control protocol connections.

2. The method of claim 1, wherein the failure to receive an acknowledgement occurs after a predefined number of attempts of transmitting the transmission control protocol segment.

3. The method of claim 1, wherein the counter is a private counter which indicates a number of times when the transmission control protocol offload function fails.

4. The method of claim 1, further comprising:
   responsive to a failure of the host computer to receive an acknowledgement of the retransmitted transmission control protocol segment that does not comprise the request for a transmission control protocol offload function, determining that the transmission control protocol offload function is not a cause of the failure.

5. The method of claim 1, wherein the transmission control protocol offload function includes one of a transmission control protocol checksum offload function or a transmission control protocol segmentation offload function.

6. The method of claim 1, wherein the transmission control protocol segment is retransmitted without the request for a transmission control protocol offload function in response to a number of failed attempts to receive an acknowledgement of the transmission control protocol segment.

7. The method of claim 1, wherein the requests to the transmission control protocol offload function for the network interface card are stopped for a predefined period of time.

8. The method of claim 7, wherein the predefined period of time includes one of minutes, hours, days, or until the data processing system is rebooted.

9. The method of claim 1, wherein a failure is determined to be an allowed failure if the failure occurs within a predefined period of time.

10. A data processing system for the detection and recovery of a network interface card transmission control protocol acceleration offload failure, the data processing system comprising:
a bus;
a storage device connected to the bus, wherein the storage device contains computer usable code;
at least one managed device connected to the bus;
a communications unit connected to the bus; and
a processing unit connected to the bus, wherein the processing unit executes the computer usable code to, in response to a failure of a host computer to receive an acknowledgement of a transmission control protocol segment comprising a request for a transmission control protocol offload function from a network interface card, retransmit the transmission control protocol segment to the network interface card, wherein the retransmitted transmission control protocol segment does not comprise the request for the transmission control protocol offload function; receive an acknowledgement of the retransmitted transmission control protocol segment, wherein receipt of the acknowledgement of the retransmitted transmission control protocol segment indicates the transmission control protocol offload function has failed; in response to receiving the acknowledgement of the retransmitted transmission control protocol segment, increment a counter to indicate a failure of the transmission control protocol offload function; and in response to determining that the counter has exceeded a predefined number of allowed transmission control protocol offload function failures, stop all transmission control protocol offload function requests to the network interface card for any existing or new transmission control protocol connections.

11. The data processing system of claim 10, wherein the failure to receive an acknowledgement occurs after a predefined number of attempts of transmitting the transmission control protocol segment.

12. The data processing system of claim 10, wherein the counter is a private counter which indicates a number of times when the transmission control protocol offload function fails.

13. The data processing system of claim 10, wherein the processing unit further executes the computer usable code to determine that the transmission control protocol offload function is not a cause of the failure in response to a failure of the host computer to receive an acknowledgement of the retransmitted transmission control protocol segment that does not comprise the request for a transmission control protocol offload function.

14. The data processing system of claim 10, wherein the transmission control protocol offload function includes one of a transmission control protocol checksum offload function or a transmission control protocol segmentation offload function.

15. The data processing system of claim 10, wherein the transmission control protocol segment is retransmitted without the request for a transmission control protocol offload function in response to a number of failed attempts to receive an acknowledgement of the transmission control protocol segment.

16. The data processing system of claim 10, wherein the requests to the transmission control protocol offload function for the network interface card are stopped for a predefined period of time.

17. The data processing system of claim 10, wherein the predefined period of time includes one of minutes, hours, days, or until the data processing system is rebooted.

18. The data processing system of claim 10, wherein a failure is determined to be an allowed failure if the failure occurs within a predefined period of time.

19. A computer program product for the detection and recovery of a network interface card transmission control protocol acceleration offload failure, the computer program product comprising:
a computer readable storage medium having computer readable program code stored thereon, the computer readable program code for execution by a computer, comprising:
computer readable program code for responsive to a failure of a host computer to receive an acknowledgement of a transmission control protocol segment comprising a request for a transmission control protocol offload function from a network interface card, retransmitting the transmission control protocol segment, wherein the retransmitted transmission control protocol segment does not comprise the request for the transmission control protocol offload function;
computer readable program code for receiving an acknowledgement of the retransmitted transmission control protocol segment, wherein receipt of the acknowledgement of the retransmitted transmission control protocol segment indicates the transmission control protocol offload function has failed;
computer readable program code for responsive to receiving the acknowledgement of the retransmitted transmission control protocol segment, incrementing a counter to indicate a failure of the transmission control protocol offload function; and
computer readable program code for responsive to determining that the counter has exceeded a predefined number of allowed transmission control protocol offload function failures, stopping all transmission control protocol offload function requests to the network interface card for any existing or new transmission control protocol connections.

20. The computer program product of claim 19, further comprising:
computer readable program code for responsive to a failure to receive an acknowledgement of the retransmitted transmission control protocol segment that does not comprise the request for a transmission control protocol offload function, determining that the transmission control protocol offload function is not a cause of the failure.

* * * * *